(12) United States Patent
Yun et al.

(10) Patent No.: US 6,956,710 B2
(45) Date of Patent: Oct. 18, 2005

(54) FLEXIBLE BPI AND TPI SELECTION IN DISK DRIVES

(75) Inventors: Jong Yun Yun, Cupertino, CA (US); Hae Jung Lee, Santa Clara, CA (US); Ken Bovatsek, San Jose, CA (US); Kieu Lien Dang, Freemont, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 115 days.

(21) Appl. No.: 10/458,666

(22) Filed: Jun. 9, 2003

(65) Prior Publication Data

US 2004/0246616 A1 Dec. 9, 2004

(51) Int. Cl.[7] ................................................. G11B 5/09
(52) U.S. Cl. ............................ 360/53; 360/31; 360/75
(58) Field of Search ............................. 360/31, 48, 53, 360/61, 64, 75, 39, 40, 55, 62, 76, 77.01, 77.02, 77.06, 77.07

(56) References Cited

U.S. PATENT DOCUMENTS

| | | | | |
|---|---|---|---|---|
| 5,583,842 A | * | 12/1996 | Wilson et al. ............ 369/53.17 |
| 6,052,250 A | * | 4/2000 | Golowka et al. ......... 360/77.08 |
| 6,061,195 A | * | 5/2000 | Wilson et al. ................. 360/48 |
| 2004/0136104 A1 | * | 7/2004 | Chiao et al. ................... 360/31 |

* cited by examiner

*Primary Examiner*—David Hudspeth
*Assistant Examiner*—Jason Olson
(74) *Attorney, Agent, or Firm*—Ben J. Yorks, Esq.; Jeffrey P. Aiello, Esq.; Irell & Manella LLP

(57) ABSTRACT

A method for determining and varying the capacity, track per inch and bit per inch values of a hard disk drive. The method includes determining an optimal track per inch value for each head of the drive. The method then determines whether each head does not exceed a threshold BER value. If one or more heads do not exceed the threshold BER value then the BPI (data rates) of the non-performing heads are decreased until an acceptable BER is achieved. The BPI of performing heads may be increased to insure that the capacity of the disk drive still meets a target value. Likewise, if all of the heads are above the threshold value, the BPI of one or more of the performing heads may be decreased to improve the BER of the heads. The reduction in BPI is limited so that the drive always meets the target capacity value. The BPI and TPI values are stored in memory for use during the operation of the drive.

7 Claims, 6 Drawing Sheets

FLEXIBLE BPI AND TPI SELECTION IN DISK DRIVES

BACKGROUND OF THE INVENTION

1. Field of the Invention

The present invention relates to a method for determining and varying the capacity and data rates of a hard disk drive.

2. Background Information

Hard disk drives contain a plurality of magnetic heads that are coupled to rotating disks. The heads write and read information by magnetizing and sensing the magnetic fields of the disk surfaces. There have been developed magnetic heads that have a write element for magnetizing the disks and a separate read element for sensing the magnetic fields of the disks. The read element is typically constructed from a magneto-resistive material. The magneto-resistive material has a resistance that varies with the magnetic fields of the disk. Heads with magneto-resistive read elements are commonly referred to as magneto-resistive (MR) heads.

Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

Information is typically stored in radial tracks that extend across the surface of each disk. Each track is typically divided up into a number of segments or sectors. The voice coil motor and actuator arm can move the heads to different tracks of the disks. The number of tracks on a disk is dependent on the width of the heads. Smaller heads will allow for more tracks. Wider heads will produce less tracks. The number of tracks is sometimes defined in terms of tracks per inch ("TPI").

The heads of a disk drive read and write data at a predetermined data rate sometimes defined in terms of bits per inch ("BPI"). Before shipping an assembled drive the heads are tested to insure that a head does not fall below a threshold bit error rate ("BER"). The BER of a head is measured while testing at an operating BPI. If the BER is below the threshold value then the drive is considered defective.

It would be desirable to provide a method for testing and adjusting the TPI and BPI of the heads to increase the yield of hard disk drives.

BRIEF SUMMARY OF THE INVENTION

A hard disk drive that includes a first head and a second head that are coupled to a disk. The disk drive also contains a memory device that contains separate bit per inch and track per inch values for the first head and the second head.

DETAILED DESCRIPTION

Disclosed is a method for determining and varying the capacity, track per inch and bit per inch values of a hard disk drive. The method includes determining an optimal track per inch value for each head of the drive. The method then determines whether each head does not exceed a threshold BER value. If one or more heads do not exceed the threshold BER value then the BPI (data rates) of the non-performing heads are decreased until an acceptable BER is achieved. The BPI of performing heads may be increased to insure that the capacity of the disk drive still meets a target value. Normally, the disk drive would be labeled defective because one of the heads did not produce an acceptable BER.

If all of the heads are above the threshold value, the BPI of one or more of the performing heads may be decreased to improve the BER of the heads. The reduction in BPI is limited so that the drive always meets the target capacity value. The BPI and TPI values are stored in memory for use during the operation of the drive.

Figure 1:
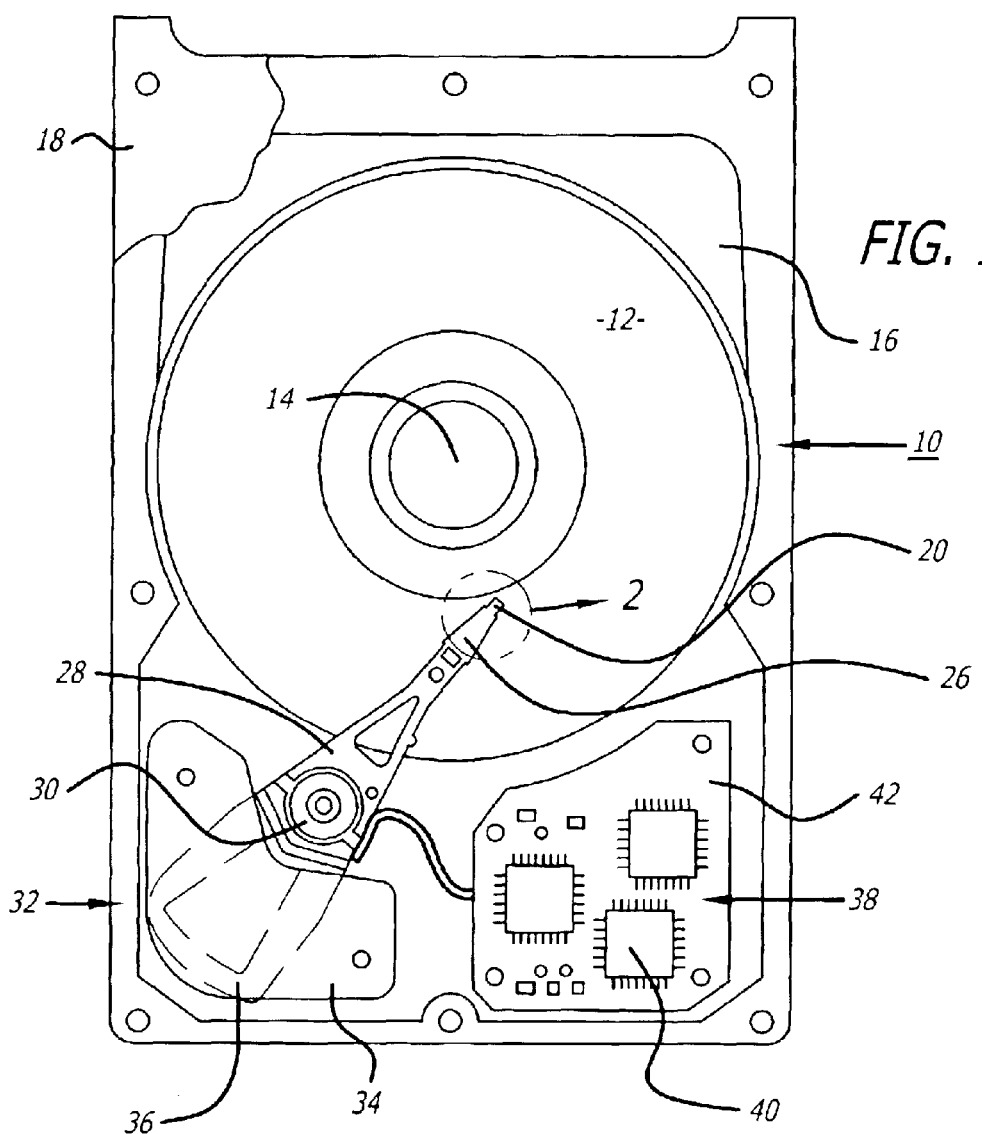
FIG. 1 is a top view of an embodiment of a hard disk drive of the present invention.

Referring to the drawings more particularly by reference numbers, FIG. 1 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12.

Figure 2:
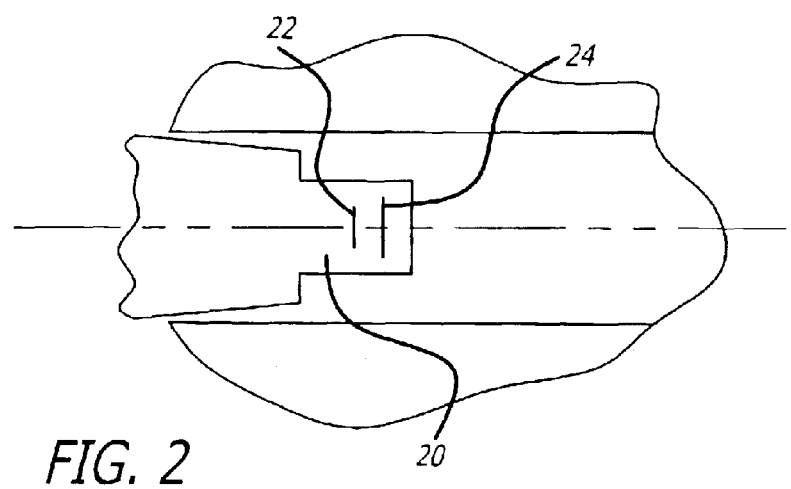
FIG. 2 is a top enlarged view of a head of the hard disk drive.

The disk drive 10 may include a plurality of heads 20 located adjacent to the disks 12. As shown in FIG. 2 the heads 20 may have separate write 22 and read elements 24. The write element 22 magnetizes the disk 12 to write data. The read element 24 senses the magnetic fields of the disks 12 to read data. By way of example, the read element 24 may be constructed from a magneto-resistive material that has a resistance which varies linearly with changes in magnetic flux.

Referring to FIG. 1, each head 20 may be gimbal mounted to a flexure arm 26 as part of a head gimbal assembly (HGA). The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 40 is coupled to the voice coil 32, heads 20 and spindle motor 14 by wires (not shown).

Figure 3:
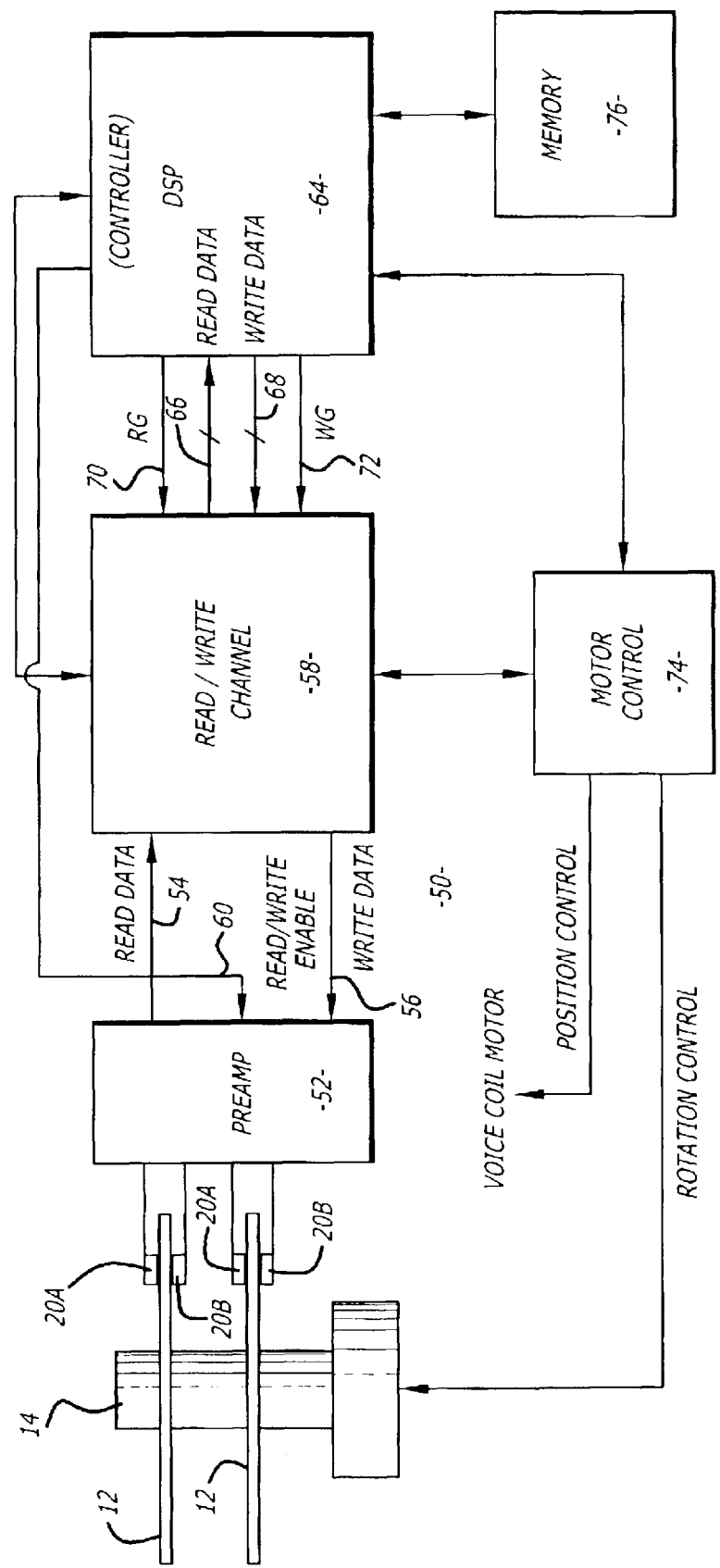
FIG. 3 is a schematic of an electrical circuit for the hard disk drive.

FIG. 3 shows an electrical circuit 50 for reading and writing data onto the disks 12. The circuit 50 may include a pre-amplifier circuit 52 that is coupled to the heads 20. Each disk 12 may included a first head 20A and a second head 20B. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 62 is connected to a controller 64 through read and write channels 66 and 68, respectively, and read and write gates 70 and 72, respectively. The read gate 70 is enabled when data is to be read from the disks 12. The write gate 72 is to be enabled when writing data to the disks 12. The controller 64 may be a digital signal processor that operates in accordance with a software routine, including a routine(s) to write and read data from the disks 12. The read/write channel circuit 62 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM").

Figure 4:
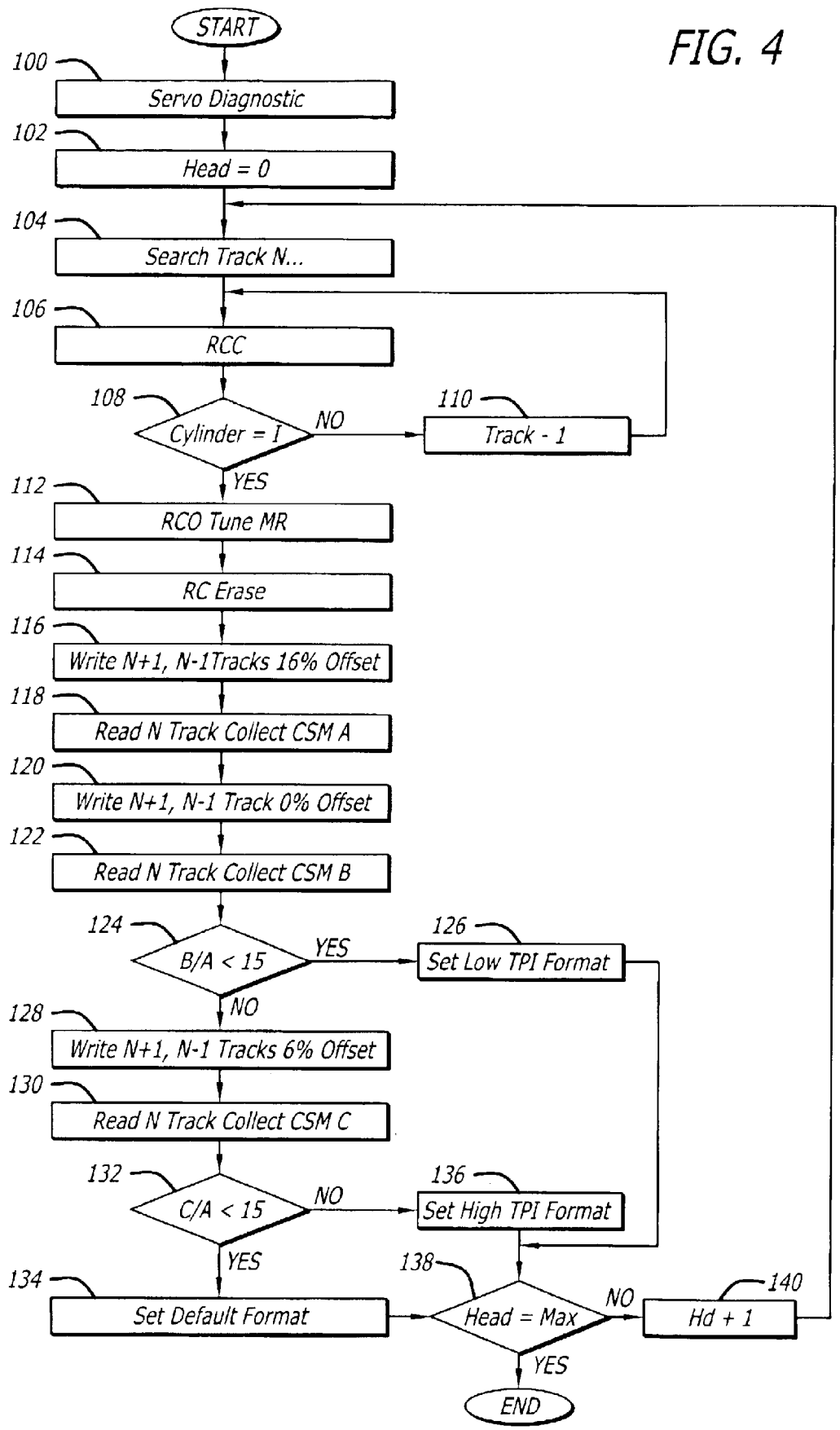
FIG. 4 is a flowchart for determining TPI values for the heads of the disk drive.

FIG. 4 is a flowchart showing a flexible TPI method. This method determines whether a head is assigned one of three TPI values. Although three values are described, it is to be understood that the method may be modified to allow for the selection of more than three values. The method may be performed by a tester that stores the TPI values in the disk drive. The TPI values may be stored in the memory device 76 and/or the disk 12. The TPI values are used to determine how many tracks are generated for each head.

In blocks 100 and 102 the method performs servo diagnostics and determines whether the zero head of the drive is being tested, respectively. The method then moves the head and conducts a RCC in blocks 104 and 106, respectively. The method determines whether the head is at the first cylinder in decision block 108. It is preferable to test at the inner diameter of the disk. If the head is not at the first cylinder the head is moved to the next adjacent track in block 110 and returns to block 106.

If the head is at the first track (cylinder) the method proceeds to blocks 112 and 114 to tune the head and DC erase the N, N+1 and N-1 tracks. A write operation is performed on the N+1 and N-1 tracks in block 116. The head is offset from the center of the N+1 and N-1 tracks by 16% during the write operations. A read operation is then performed on the N track to collect CSM A data in block 118. In block 120 a write operation is performed on the N+1 and N-1 tracks with a 0% offset. A read operation is performed on the N track again to collect CSM B data in block 122.

In decision block 124 it is determined whether the ratio B/A is less than a threshold value (eg. 15). A ratio not less than the threshold value is indicative of a wide head and the TPI value for the head is set at a low value in block 126. If the ratio is less than the threshold value a write operation is performed on the N+1 and N-1 tracks with a 6% offset in block 128. In block 130 a read operation is performed on the N track to collect CSM C data. The ratio C/A is compared with the threshold value in decision block 132. If the ratio is not less than the threshold a default TPI value is set in block 134. If the ratio is less than the threshold value the TPI value is set to a high number in block 136.

Decision block 138 determines whether the last head has been tested. If not, the head number is incremented one in block 140 and returns to block 104. The process ends if the method has tested the last head. Although 6% and 16% offset values are described, it is to be understood that other values may be implemented.

Figure 5A:
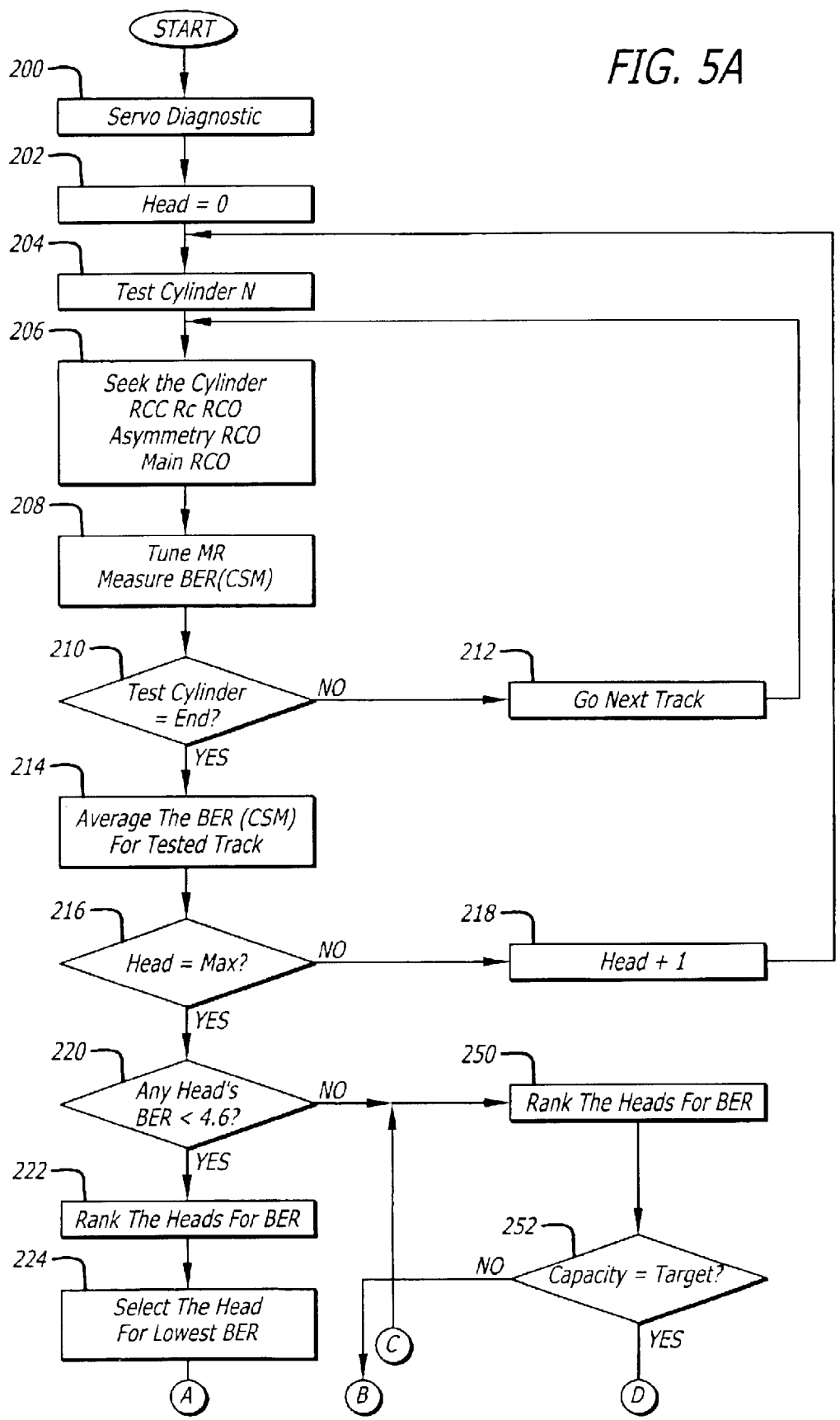
FIGS. 5A–C are a flowchart for determining BPI values for the heads of the disk drive.
Figure 5B:
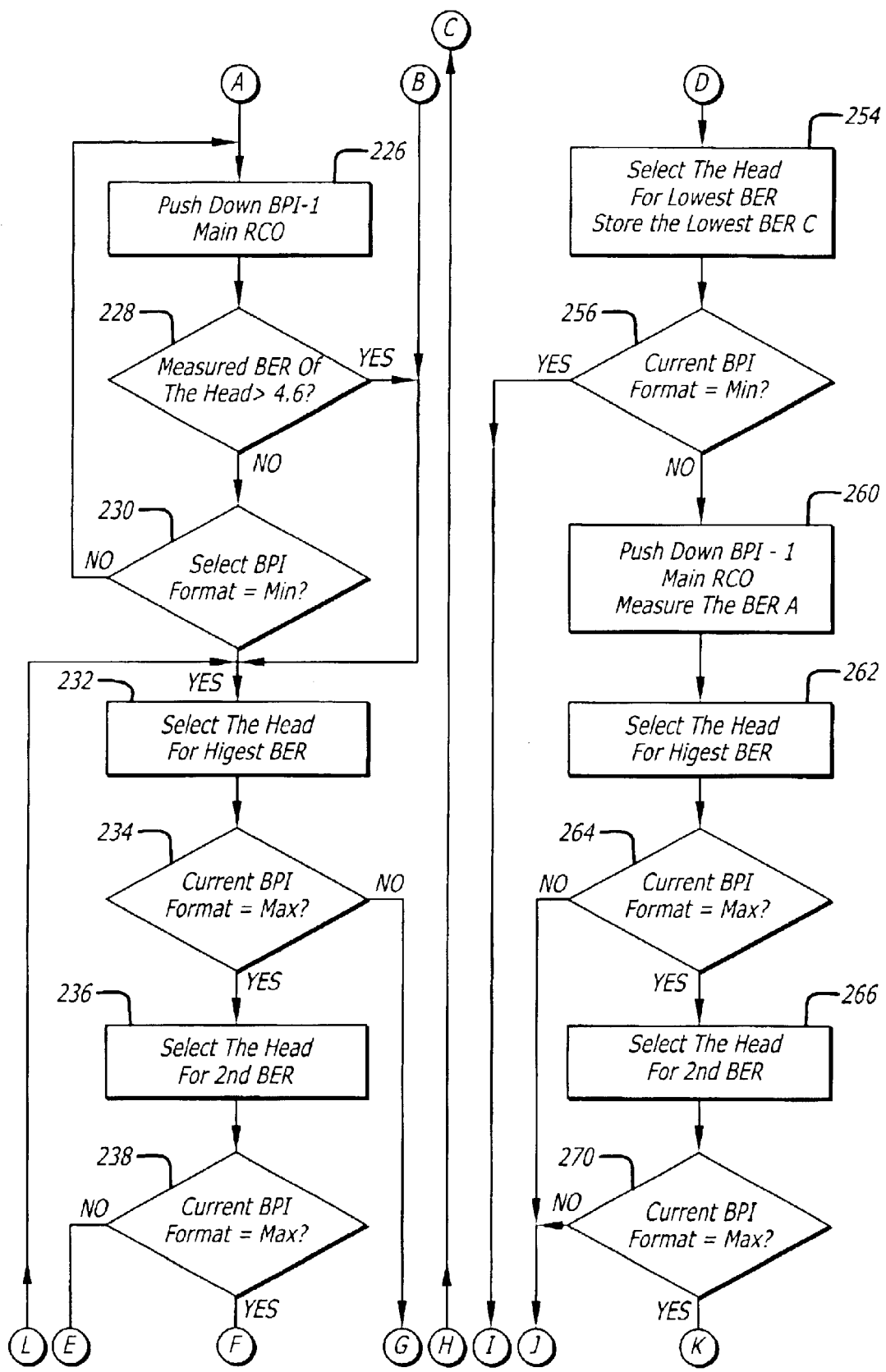
Figure 5C:
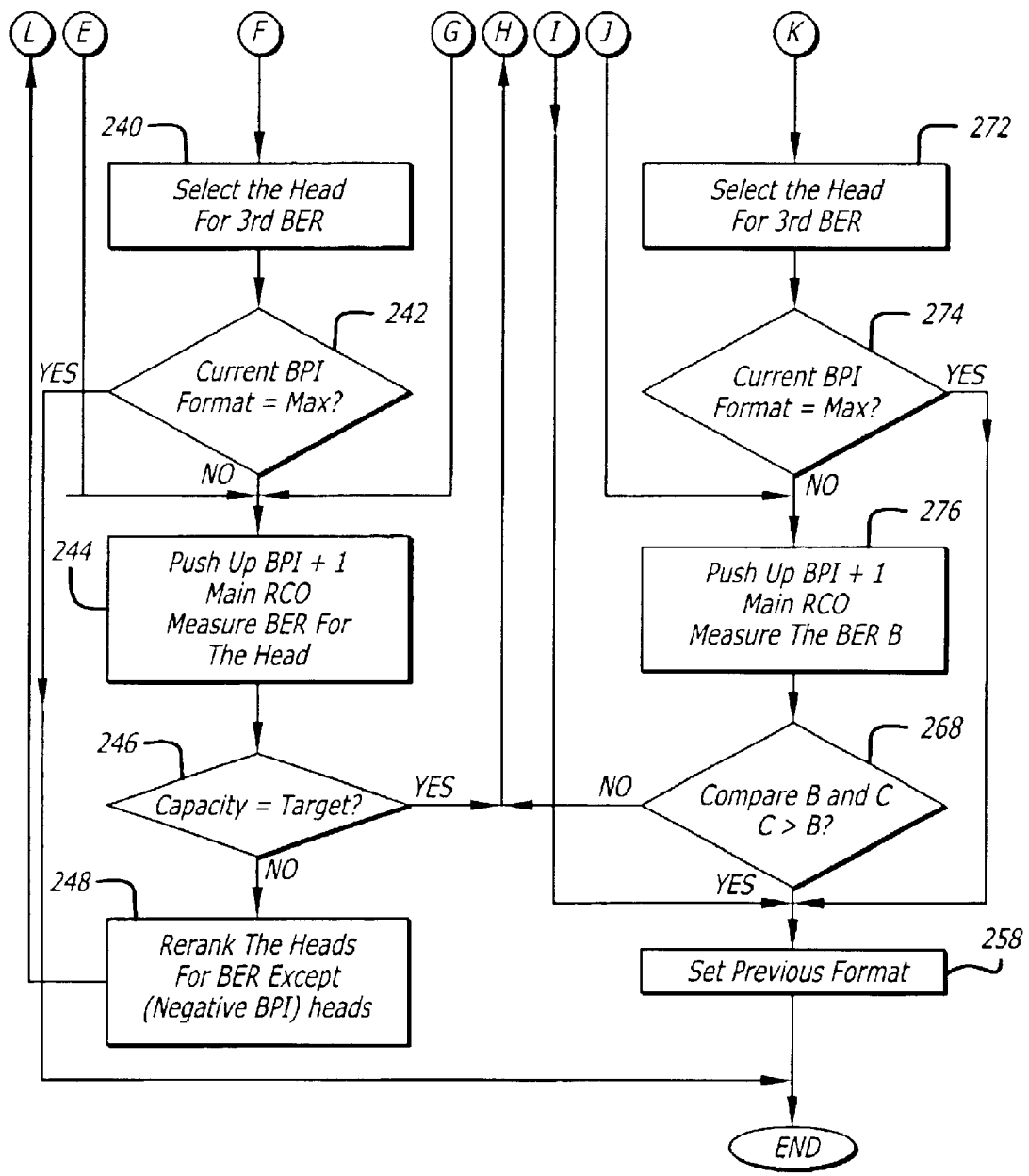

FIGS. 5A-C show a flowchart for a flexible BPI method. The method can further optimize the yield and performance of a disk drive. In blocks 200 and 202 the method performs servo diagnostics and determines whether the zero head of the drive is being tested, respectively. The method determines whether the head is at the first track (cylinder N) and performs a seek routine in blocks 204 and 206. A read operation is performed in block 208 to obtain a bit error rate (BER) for the track. Decision block 210 determines whether the head has reached the last track. If not, the head is moved to the next track in block 212 and the process returns to block 206.

If the head is at the last track the BER for all of the tracks is averaged in block 214. Decision block 216 determines whether the last head has been tested. If not, the head number is incremented by one in block 218 and the process returns to block 204. The BER of each head is determined at the same data rate or BPI.

If the last head has been tested then decision block 220 determines whether the average BER of any head is below a threshold value. If one of the heads is below the threshold the heads are ranked in block 222 and the head with the lowest ranked BER is selected in block 224. The lowest ranked head is again tested to accumulate an average BER at a lower BPI in block 226. In decision block 228 it is determined whether the average BER at the lower BPI is less than the threshold value. If not, decision block 230 determines whether the head has been tested with the lowest BPI.

If the BPI can be lowered the process returns to block 226. If the BPI cannot be lowered, or the BER is greater than the threshold value then the head with the highest ranked BER is selected in block 232 and decision block 234 determines whether the BPI of the highest ranked BER can be increased. If the current BPI is equal to the maximum value the process proceeds to evaluate the second highest and third highest ranked heads in blocks 236, 238, 240 and 242. If the BPI is not at a maximum the process proceeds to block 244 where the BPI is increased and a new average BER is generated for the selected head.

In decision block 246 it is determined whether the capacity of the disk drive is equal to a target value. The capacity of the drive is calculated by multiplying the BPI times the TPI for each head and then adding the multiplied values of each head. A head with a BER that does not exceed the threshold value is not included in this calculation. The BPI values are the values used in blocks 226 and 244. If the capacity is not equal to a target value the heads are re-ranked in block 248 and the process returns to block 232. If the first, second and third highest ranked heads are all at the maximum BPI values the process ends and the disk drive is labeled defective.

This process slows down the BPI of a non-performing head and increases the BPI of a performing head so that the lowest ranked head can meet performance standards without reducing the capacity of the drive. Although the first, second and third ranked heads are shown as being adjusted, it is to be understood that a different number of heads can be used to offset a lower performing head.

Referring again to FIG. 5, if all of the heads are above the threshold, or the capacity equals the target, the process proceeds to block 250 where the heads are ranked based on the respective BER values. Decision block 252 determines whether the capacity is equal to the target value. If not, the process proceeds to block 226.

If the capacity is equal to the target the lowest ranked head is selected and the BER for this head is set as data C in block 254. Decision block 256 determines whether the BPI is at a minimum. If the BPI is at a minimum then the BPI is set at this value in block 258 and the process ends.

If the BPI is not a minimum then the BPI of the lowest ranked head is lowered and a new BER average is generated and set as data A in block 260. The highest ranked head is then selected in block 262. Decision block 264 determines whether the highest ranked head is at a maximum BPI. If not, the BPI is increased and a new average BER is generated and set as data B in block 266. If so, decision block 268 determines whether data C is greater than data B. If so, the BPI values are set in block 258 and the process ends. If not, the process proceeds to blocks 270, 272, 274 and 276 to possibly increase the BPI of the second and third ranked heads. The BPI values are ultimately stored in a memory device of the hard disk drive such as the ROM 76 or the disk 12. The BPI values are sued to determine the data rate of each head in a read or write operation.

The flexible BPI method allows the capacity and/or yield of the drive to be optimized by varying the BPI values of the heads.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method to set a bit per inch value of a head of a hard disk drive, comprising:

selecting a bit per inch value of a first head;

determining a bit error rate of the first head;

selecting a bit per inch value of a second head;

determining a bit error rate of the second head;

ranking the heads based on bit error rates; and, changing the bit per inch value of the head with the highest bit error rate.

2. The method of claim 1, wherein the bit per inch value of the head with the highest bit error rate is lowered if the capacity of the hard disk drive is greater than a target value.

3. The method of claim 1, wherein the bit per inch value of the head with the highest bit error rate is increased if the capacity of the hard disk drive is lower than a target value.

4. The method of claim 1, wherein the heads are ranked relative to a threshold bit error rate.

5. The method of claim 1, further comprising varying the track per inch values of the head with the highest bit error rate.

6. The method of claim 5, further comprising storing the track per inch and the bit per inch values in a memory device.

7. The method of claim 1, further comprising storing data on tracks of a disk in accordance with the track per inch values, and reading and writing data of the disk at a data rate which corresponds to the bit per inch values.

* * * * *